United States Patent [19]

Schukei et al.

[11] Patent Number: 4,483,457

[45] Date of Patent: Nov. 20, 1984

[54] HINGED STEAM GENERATOR NOZZLE PLUG

[75] Inventors: Glen E. Schukei, South Windsor, Conn.; Lee A. Tade, III, Hixson, Tenn.

[73] Assignee: Combustion Engineering, Inc., Windsor, Conn.

[21] Appl. No.: 480,972

[22] Filed: Mar. 31, 1983

[51] Int. Cl.³ ............................................. F16L 55/12
[52] U.S. Cl. ..................................... 220/232; 138/93; 217/78; 277/34
[58] Field of Search ........................... 277/23, 34, 34.3; 220/232, 225; 138/93, 89; 217/78

[56] References Cited

U.S. PATENT DOCUMENTS

| | | | |
|---|---|---|---|
| 694,171 | 2/1902 | Mink | 217/78 |
| 2,366,911 | 1/1945 | Laird | 220/225 |
| 2,604,224 | 7/1952 | Howe | 217/78 |
| 2,697,534 | 12/1954 | Topley | 217/78 |
| 2,714,024 | 7/1955 | Greene | 277/2 |
| 3,343,708 | 9/1967 | Haas | 220/225 |
| 3,371,986 | 3/1968 | Brown | 220/232 |
| 4,342,336 | 8/1982 | Sattertawatte | 138/93 |

Primary Examiner—Robert I. Smith
Attorney, Agent, or Firm—Troxell K. Snyder

[57] ABSTRACT

A nozzle plug (22) for blocking a nozzle (46) in a nuclear steam generator (16) is improved by the addition of hinges (40a, 40b) which allow the nozzle plug (22) to be inserted into the steam generator (16) through an access port (52) of substantially smaller diameter than the nozzle (46). A recess (54) is provided in one of the semi-circular plates (28) allowing the plates to nest, further reducing the necessary size of the access port (46).

6 Claims, 5 Drawing Figures

HINGED STEAM GENERATOR NOZZLE PLUG

FIELD OF THE INVENTION

The present invention pertains to an improvement in plugs employable in a passage to effect the blockage of liquid therethrough, and more particularly to a plug that is capable of being used to provide a temporary liquid tight seal in a nozzle of a steam generator of the kind that is cooperatively associated with a nuclear reactor in a conventional nuclear power generating system.

BACKGROUND OF THE INVENTION

It has long been known in the prior art to employ a plug to effect a blockage of a normally open passage, when for some particular reason such action is deemed necessary. Moreover, the prior art is known to be replete with examples of various forms of plugs, which differ one from another in terms of configuration, mode of construction, etc. On the other hand, even though a multiplicity of plugs of different designs exist in the prior art, there continue to arise applications wherein it would be desirable to be able to employ a plug. However, due to the peculiar nature of the application, the plugs of known design are unsuitable for use therein.

One such application involves the accomplishment of the blockage of the inlet nozzle and/or the outlet nozzle of a steam generator, the latter being of the type that is suitable for employment in cooperative association with a nuclear reactor to form therewith a component part of a nuclear power generating system.

Periodically, there arises a need to conduct maintenance on and/or to effect minor repairs of the internal components of the steam generator. To accomplish such tasks, it is necessary for one or more persons to physically enter the steam generator. Ingress and egress from the steam generator by such persons is accomplished through suitable means such as for example an access port. While such persons are working in the steam generator, it is desirable that a blockage of the inlet and the outlet nozzle of the steam generator be effected to insure that there will be no fluid flow through the steam generator, which might imperil the lives of the people working therein.

One such design of a nozzle plug for a nuclear steam generator is disclosed in co-pending application Ser. No. 349,565 by Wentzell filed Feb. 17, 1982, entitled "Nozzle Plug For Submersible Vessel", which is herein incorporated by reference. This prior design is substantially comprised of a plurality of plate sections which are assembled within the steam generator to form the plug which is secured within the particular nozzle to be blocked. As this assembly and securing of the nozzle plug within the steam generator must be accomplished in an area where radioactivity may be present, it is desirable to be able to perform these operations as quickly and as efficiently as possible.

SUMMARY OF THE INVENTION

The present invention relates to an improvement of the nozzle plug disclosed in the above-identified application, wherein the plate sections of the nozzle plug are interconnected by hinges which permit the folding of the plate sections whereby the folded nozzle plug may be inserted through an access port into the interior of the steam generator. The use of hinges between adjacent plate sections allows the nozzle plug according to the present invention to be inserted into the steam generator and quickly extended into a plug having a cross section substantially the same as that of the nozzle to be blocked.

The present invention also discloses a recess formed in at least one of the semicircular sections of the nozzle plug for allowing the nesting of the folded plate sections. By nesting the folded sections, the folded nozzle plug may pass through a smaller access port than would otherwise be possible.

It is therefore an object of the present invention to provide a nozzle plug which may be inserted in a folded condition through an access port which is substantially smaller than the nozzle passage to be plugged in said steam generator.

It is a further object according to the present invention to provide a nozzle plug which may be quickly transformed from the folded state to an extended, or assembled state preparatory to being secured within the nozzle to be blocked.

It is still further an object according to the present invention to provide a nozzle dam wherein the folded plate sections will cooperatively nest one within the other for the purpose of reducing the diameter of the access port required to admit a nozzle plug for use in a nozzle of a given inner diameter.

BRIEF DESCRIPTION OF THE PREFERRED EMBODIMENT

Figure 1:
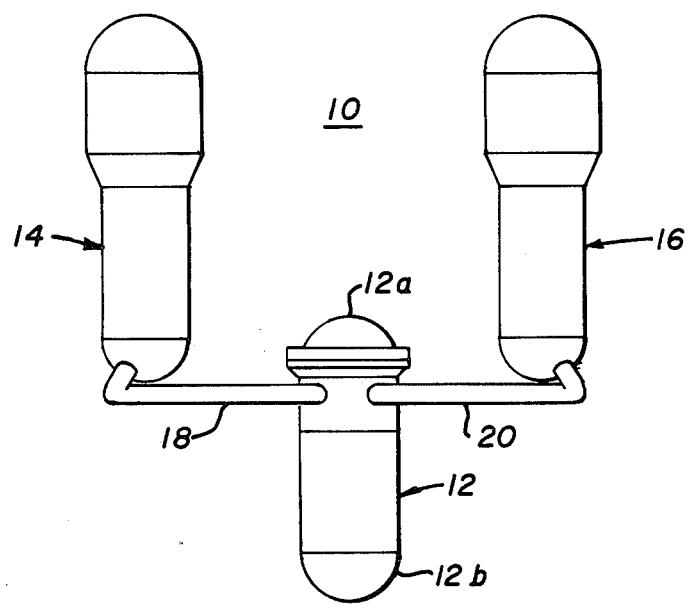
FIG. 1 shows a nuclear steam generator system of the conventional type wherein the nozzle plug according to the present invention may be used.

Referring now to FIG. 1, there is illustrated therein a conventional type of nuclear power generating system, the latter being designated therein generally by reference numeral 10. More specifically, the nuclear power generating system 10 includes a nuclear reactor housed in a pressure vessel 12, and a pair of steam generators 14, 16 that are cooperatively associated with the pressure vessel 12. As shown in FIG. 1, the fluid interconnection between the pressure vessel 12 and the steam generators 14, 16 is accomplished by means of conduits 18 and 20, respectively, in a manner well known to those skilled in the art. Note should be taken herein particularly of the fact that the conduits 18 and 20 are connected to the pressure vessel 12 at points located adjacent to the point where the closure head 12a of the pressure vessel 12 is joined to the main body portion 12b of the vessel 12. Accordingly, when the pressure vessel is drained to the requisite extent to permit the closure head 12a to be removed therefrom while at the same time maintaining a liquid coverage of the fuel assembly, the effect is to also concurrently cause a draining of the steam generators 14, 16.

It has been found advantageous, in the servicing of nuclear power generating systems such as those shown in FIG. 1, to effect a fluid tight blockage of the conduits 18, 20 between the steam generators 14, 16 and the pressure vessel 12. In this manner, service personnel may freely access and work within the steam generators 14, 16 without regard to the water level within the pressure vessel 12. This has been found to result in increased efficiency and speed in service operations.

One such nozzle plug in the prior art for use in establishing a fluid tight seal in the passages or nozzles entering the steam generators 14, 16 comprises a plurality of plate sections which are assembled within the steam generator to form a nozzle plug of substantially the same cross sectional area as the particular steam generator nozzle to be plugged. The sectioning of the nozzle plug in the prior art is required due to the limited size of the access port wherethrough personnel and equipment enter the steam generators. In a typical steam generator of the type as shown in FIG. 1, the access port for personnel and equipment (not shown) would be approximately 16 inches (40.64 centimeters) in diameter, while the nozzles to be plugged range from approximately 30 inches (76.2 centimeters) to 42 inches (106.68 centimeters) in diameter. A solid plug would therefore not be insertable into the steam generator for forming a fluid tight seal in a typical nozzle.

Figure 2:
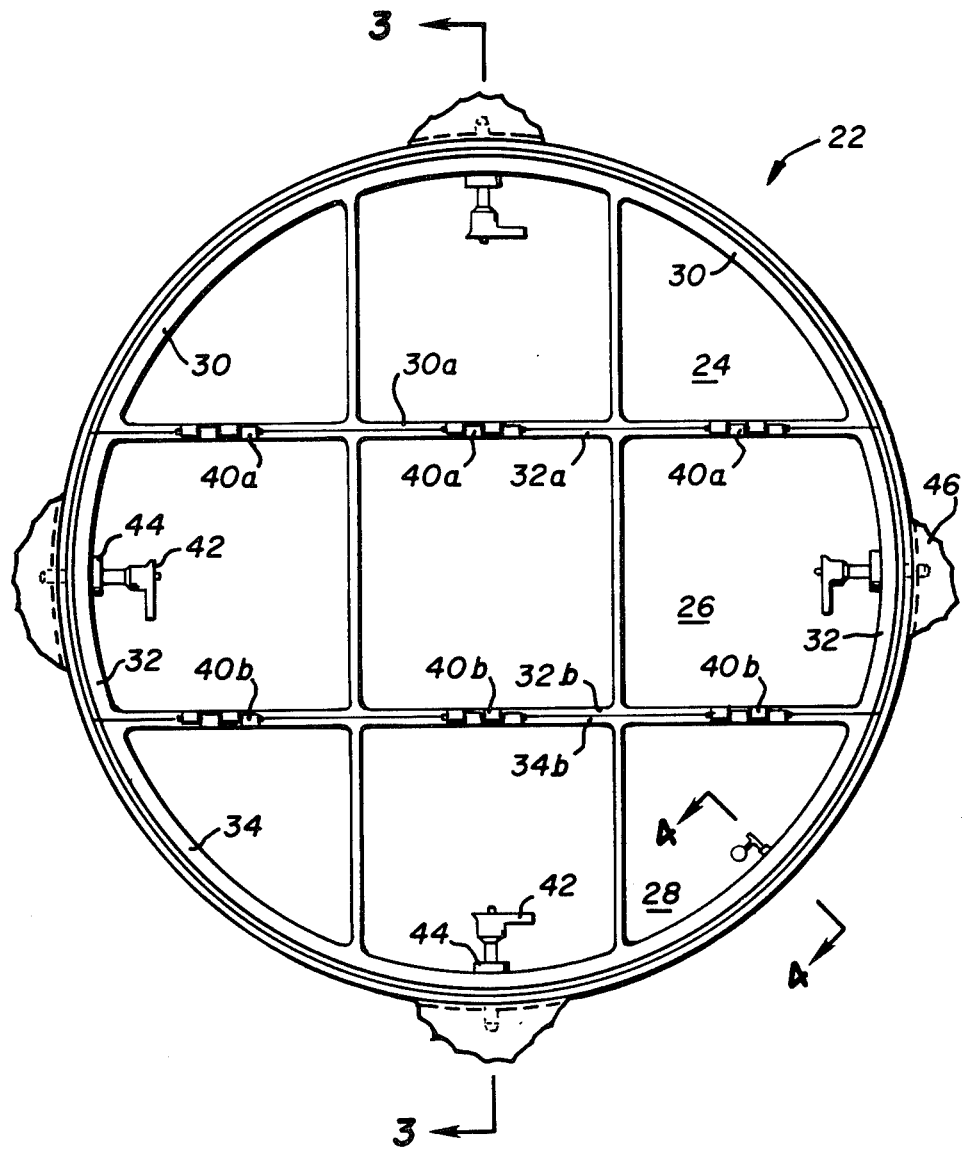
FIG. 2 shows a view of the extended nozzle plug as it would appear when secured within the nozzle of a steam generator.

FIG. 2 shows a three-section nozzle plug 22 according to the present invention as it would be seen as installed in a nozzle of a steam generator from a vantage point within the steam generator. The nozzle plug 22 as shown in the Figure has three plate sections 24, 26, 28, two of which 24, 28 are semicircular in configuration. A raised rim, or sidewall 30, 32, 34 encircles the outer perimeter of each of the plate sections 24, 26, 28, respectively. These raised rims or sidewalls provide stiffening for the individual plate sections and allow mounting of the inflatable bead 36, 38 as will be disclosed more fully below.

Adjacent plate sections 24, 26 and 26, 28 are shown interconnected by hinge means 40a, 40b secured to the internal adjacent sidewalls 30a, 32a, and 32b, 34b of the adjacent plate sections 24, 26 and 26, 28, respectively. The nozzle plug according to the present invention is secured within the nozzle of the steam generator by securing means shown as pins 42 insertable through bosses 44 in the sidewalls 30, 32, 34 of the hinged plate sections 24, 26, 28. The pins 42 pass through the bosses 44 and into the walls 46 of the steam generator nozzle as shown in the drawing figure.

Figure 3:
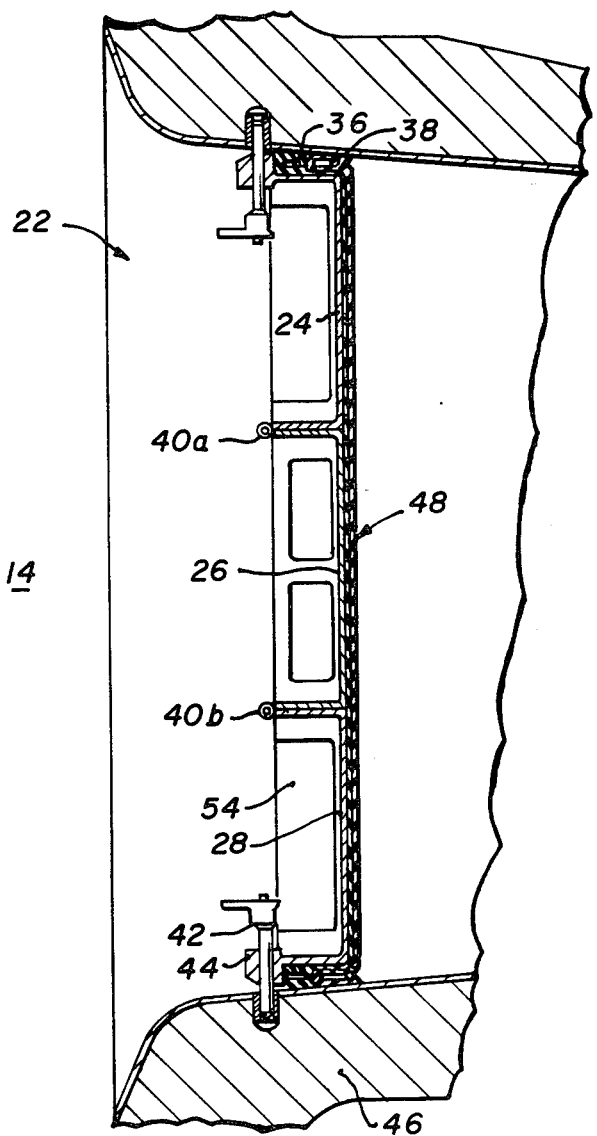
FIG. 3 shows a cross sectional view of the secured nozzle plug.

FIG. 3 shows a cross sectional view of the nozzle plug shown in FIG. 2. The plug as shown in FIGS. 2 and 3 is in the extended, or unfolded state, embodying a cross sectional area substantially equal to that of the steam generator nozzle 46. A fluid-tight membrane, designated generally by numeral 48, can be seen positioned over the surface of the plate sections 24, 26, 28 which faces toward the steam generator 12 in the nozzle 46. The local seal between the inner surface of the nozzle 46 and the sidewall sections 30, 32, 34 is effected by a pair of inflatable beads 36, 38 which are disposed about the circumference of the extended nozzle plug. Upon positioning of the extended nozzle plug 22 in the nozzle of the steam generator 46, the beads are inflated by an inflating means (not shown) such as a bicycle air pump to form a redundant fluid tight seal about the circumference of the plug 22.

Figure 4:
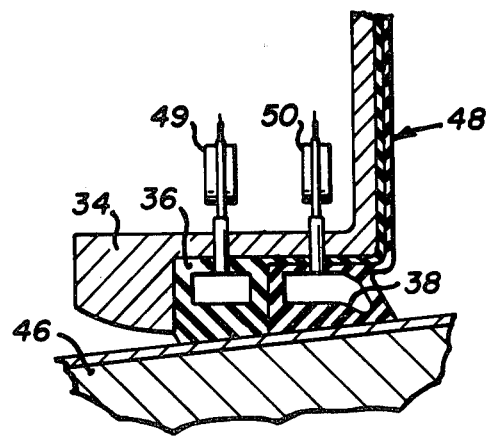
FIG. 4 shows a detailed representation of the sealing bead between the nozzle plug sidewall and the steam generator nozzle.

A detailed view of the interaction between the side wall 34 and nozzle 46 is shown in FIG. 4. The individual inflatable bead sections 36, 38 are inflated through inflation stems 49, 50.

Figure 5:
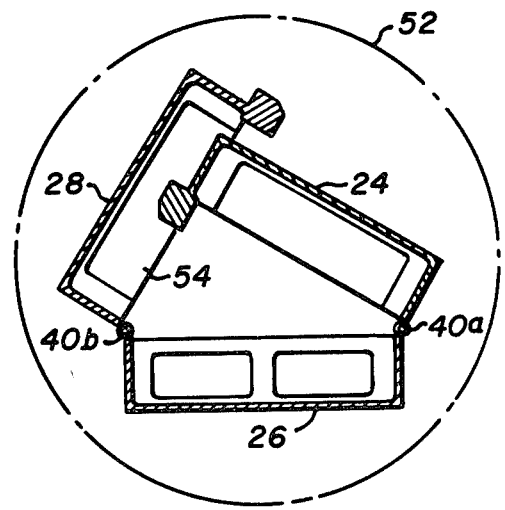
FIG. 5 shows a cross sectional view of the folded and nested nozzle plug as it would appear when being inserted into the steam generator.

The nozzle plug according to the present invention is shown in the folded state in FIG. 5, as the plug would appear in cross section while being inserted through the access port into the interior of the steam generator. The securing pins 42 (not shown) and the inflatable member 48 have been removed and the individual sections 24 and 28 folded sequentially on the hinges 40a, 40b. As can be seen from the drawing figure, the folded nozzle dam is easily insertable through an access opening 52 of much smaller diameter than that of the nozzle to be plugged. Once positioned inside the steam generator, the nozzle dam may be quickly extended into operating configuration, the membrane 48 attached, and the entire assembly secured within the nozzle to be blocked. This may be contrasted with nozzle plugs in the prior art wherein clamps or other interconnecting means to bind adjoining plate sections is required. The hinged nozzle plug according to the present invention results in significant time savings and also results in additional flexural strength of the assembled, extended nozzle plug, due to the greater area of interconnection allowed by the use of the hinges 40a, 40b, by the close fit of the hinges 40a, 40b which prevents separation of the plate sections 24, 26, 28, and by the location of the hinges opposite the water loading and therefore held in tension.

FIG. 5 also discloses the nesting of the hinged semicircular sections 24, 28, wherein the necessary diameter of the access port may be even further reduced for a nozzle plug of a given extended diameter. Nesting of the hinged sections 24, 28 is defined by the positional relationship wherein the first semicircular section 24 may be placed at least partially within a recess 54 formed within the side walls 34, 34b of the second semicircular section 28. In particular, for a nozzle plug adapted to block a 35 inch diameter (88.9 centimeter) nozzle passage, the foldable nozzle plug with raised sidewalls would be unable to pass into the interior of the steam generator through a 16 inch (40.64 centimeter) access port unless the semicircular sections 24, 28 were able to so nest.

The improved nozzle plug according to the present invention is therefore seen to provide an advantage over nozzle plugs of the prior art by allowing the entire nozzle plug to be inserted into the interior of a steam generator through a relatively small access port in comparison to the size of the nozzle to be blocked, without the need for complete disassembly of the nozzle plug into individual plate sections. By providing a recess in at least one of the semicircular sections in the three section nozzle plug, such as the plug disclosed in the drawing figures, the sections may be allowed to nest when in the folded state, thereby permitting a folded nozzle plug designed for a nozzle of over twice the diameter of that of the access port to be inserted within the steam generator through said access port.

While the nozzle plug as disclosed in the drawing figures is shown to be of generally planar configuration when fully extended, it is also within the scope of this invention wherein the extended nozzle plug may have a slightly bowed configuration when viewed in cross section.

We claim:

1. In a steam generator for use in a nuclear power generating system, said steam generator having at least one nozzle through which fluid enters or exits said steam generator, and an access port providing communication into the interior of said steam generator, said access port further having a smaller passage area than said nozzle, an improved nozzle plug for effecting a temporary fluid tight seal within said nozzle, comprising:

a plurality of sections of plate configured to cooperatively form a plug having a cross sectional area substantially the same as said nozzle, said sections of plate further each including a raised sidewall secured about the outer edge for providing flexural strength thereto and for supporting a membrane formed of a leak proof material having an inflatable sealing bead between the sections of plate and the nozzle;

means, secured to the corresponding sidewall of each of adjacent sections of plate, for hinging said adjacent sections of plate, said hinge means allowing the sections of plate to be altered from an extended state, wherein the sections of plate embody a cross sectional area equivalent to the cross sectional area of said nozzle, and a folded state, wherein the sections of plate may be passed through said access port into said steam generator without disassembly into separate components;

means for securing said plurality of sections of plate when in the extended state within the nozzle in blocking relation to the flow of liquids therethrough, said securing means operating cooperatively between the sections of plate and the nozzle.

2. The improved nozzle plug as recited in claim 1, further comprising means for inflating the inflatable bead around the extended, secured sections of plate for effecting a fluid tight seal in said nozzle.

3. The improved nozzle plug as recited in claim 1, wherein the plurality of sections of plate are at least three in number.

4. The improved nozzle plug as recited in claim 1, wherein at least two of the sections of plate are semicircular.

5. The improved nozzle plug as recited in claim 3, wherein at least two of the sections of plate are semicircular.

6. The improved nozzle plug as recited in claim 4, wherein the sections of plate are three in number and at least one semicircular section of plate is provided within a recess within the sidewall, said recess being adapted to accept a portion of the other semicircular plate therewithin when said nozzle plug is in the folded state, thereby allowing the sections of plate to nest for passage through the access port.

* * * * *